J. V. CORNEY ETAL 3,311,841

FREQUENCY CONTROL SYSTEM WITH PHASE
CONSCIOUS CONTROL INTERRUPTER

Filed April 1, 1965

INVENTORS
JOHN VICTOR CORNEY
ANTHONY ISAACS
BY

ATTORNEYS

March 28, 1967

J. V. CORNEY ETAL 3,311,841

FREQUENCY CONTROL SYSTEM WITH PHASE
CONSCIOUS CONTROL INTERRUPTER

Filed April 1, 1965

INVENTORS
JOHN VICTOR CORNEY
ANTHONY ISAACS
BY

ATTORNEYS

United States Patent Office 3,311,841
Patented Mar. 28, 1967

3,311,841
FREQUENCY CONTROL SYSTEM WITH PHASE CONSCIOUS CONTROL INTERRUPTER
John Victor Corney and Anthony Isaacs, both of London, England, assignors to Ferguson Radio Corporation Limited, London, England, a British corporation
Filed Apr. 1, 1965, Ser. No. 444,773
Claims priority, application Great Britain, Oct. 4, 1961, 35,773/61
16 Claims. (Cl. 331—14)

This application is a continuation-in-part of Ser. No. 227,786, filed Oct. 2, 1962, and now abandoned.

The present invention relates to frequency control systems and specifically to systems for synchronising the frequency of electric oscillations in the output of an oscillation generator with the frequency of reference oscillations.

In any such frequency control system the rate at which the frequency of the controlled oscillations changes in response to a change in the frequency of the reference oscillations is determined by the speed of response of the control system. Similarly the range, known as the "lock-in" range, of the frequency of the controlled oscillations, relative to the frequency of the reference oscillations, for which the control system is able to establish the frequency synchronism of the output and the reference oscillations, is also determined by the speed of response of the control system.

In known frequency control systems where it is desirable both to make small the maximum rate at which the frequency of the output oscillations can vary and to make large the "lock-in" range, a compromise has to be arranged between the maximum rate at which the frequency of the output oscillations can vary and the "lock-in" range.

It is an object of the present invention to provide an improved frequency control system in which the need for arranging a compromise between the maximum rate at which the frequency of the output oscillations can be allowed to vary and the "lock-in" range of the system is avoided.

According to the present invention there is provided a frequency control system for synchronising the frequency of oscillations in the output of an oscillation generator with the frequency of reference oscillations supplied to the system, comprising a phase comparator adapted, in a normal condition, to be so responsive to a variation in the phase of the output oscillations relative to the reference oscillation as to vary the frequency of the output oscillations in a manner such as to tend to cancel the variation in phase, and switching means adapted to switch the comparator to a further condition in which it is unresponsive to the variation in phase following an advance or retardation of the said phase into a first or a second predetermined range respectively in which the variation in the frequency of the output oscillations would be reversed or tend to be reversed and subsequently to switch the comparator back to its normal condition immediately the said phase has been advanced or retarded through the first or second range respectively, the arrangement being such that the frequency of the output oscillations remains, in operation, substantially constant, whilst the comparator is in its further condition, at the frequency obtaining immediately before the comparator is switched to its further condition.

Preferably the system includes a circuit adapted to derive from the output oscillations a corresponding train of control pulses having a frequency and phase fixed relative to the frequency and phase of the output oscillations, and the comparator is adapted to compare the phase of the control pulses with that of the reference oscillations by a sampling action, the control pulses acting as sampling pulses. It is further preferred to arrange that the waveform of the reference oscillations is trapezoidal and that the system is arranged in such a manner that with the frequency of the output oscillations held identical with that of the reference oscillations each control pulse coincides with a part of a predetermined one of the sloping edges of the trapezoidal waveform.

The switching means may comprise a switching pulse generator adapted to supply a switching pulse to an "AND" gate coincident with a predetermined part of each period of the reference oscillations, the "AND" gate being adapted to detect coincidence between a switching pulse and a control pulse and to cause the comparator to be switched to its further condition when coincidence occurs, the phase of the output oscillations relative to the reference oscillations having been advanced or retarded into the first or the second range respectively when coincidence of a switching pulse and a control pulse occurs.

The switching means may also comprise a restoring pulse generator adapted to supply a train of restoring pulses to a further "AND" gate at a recurrence frequency equal to the frequency of the reference oscillations, the further "AND" gate being adapted to cause the comparator, when in its further condition, to be switched back to its normal condition when coincidence of a restoring pulse and a control pulse occurs, the phase of the output oscillations relative to the reference oscillations having then passed through the first or the second predetermined range in the one or the opposite sense respectively.

The reference oscillations may be supplied to the control system by any one of a plurality of reference sources, a source switch being adapted simultaneously to select the reference source which is to supply reference oscillations to the control system and to switch the comparator to its further condition, whereby a phase difference between a set of oscillations generated by one reference source and a succeeding set of oscillations generated by another reference sources does not give rise to a demand for a corresponding sudden phase shift in the output oscillations.

Finally phase correcting means may be provided for so varying the relative phases of the train of restoring pulses and the reference oscillations in response to changes in either the frequency of the reference or the output oscillations that when coincidence of a restoring pulse and a control pulse occurs at any given frequency the phase of the output oscillations relative to the reference oscillations has a value substantially equal to the value to which the comparator tends to restore the phase at that given frequency.

An example of the invention will now be described with reference to the accompanying drawings in which.

In the following detailed description the signals from each part of the circuit will be identified by the same reference numeral as the circuit in which they originate with the addition of a prime.

Figure 1:
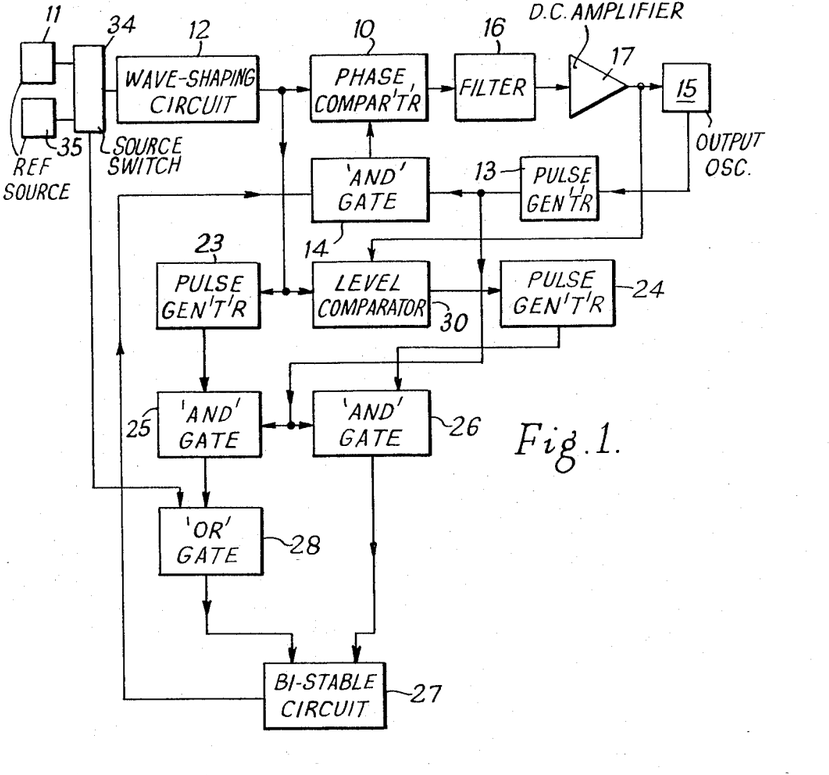
FIG. 1 is a schematic diagram of a frequency control system embodying the invention.

Referring to FIG. 1 either of two sources of reference oscillations 11 and 35 can be connected through a source switch 34 to a wave-shaping circuit 12. For the purpose of description it will first be assumed that the switch 34 connects the source 11 to the wave-shaping circuit 12. A phase comparator 10 has two input circuits and an output circuit. One of the input circuits is connected to the source 11 of reference oscillations 11' by way of the switch 34, and the wave-shaping circuit 12, and the other input circuit has a pulse generator 13 connected thereto by way of "AND" gate 14. An output oscillator 15 of variable frequency is connected to the pulse generator 13 and controls both the frequency and phase thereof. The output circuit of the phase comparator 10 is connected through a low-pass filter 16 and a D.C. amplifier 17 to a control circuit of the output oscillator 15.

Figure 2A:
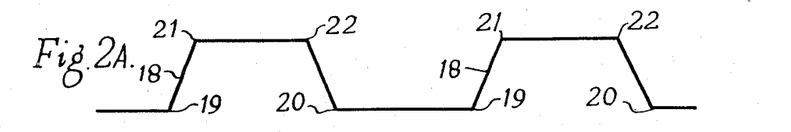
FIGS. 2A, 2B, 2C and 2D show the waveforms of oscillations and pulses generated in different parts of the frequency control system of FIG. 1.

The reference source 11 is arranged to supply reference oscillations 11' to the wave-shaping circuit 12 which shapes the waveform of the reference oscillations into trapezoidal form 12' as shown in FIG. 2A, each cycle of the shaped oscillations 12' including an edge 18 of positive slope. The shaped oscillations are supplied directly to the one input circuit of the phase comparator.

The output oscillator 15 is arranged to supply output oscillations 15' to the pulse generator 13 which in response to the output oscillations generates a train of control pulses 13' of the same frequency as the output oscillations 15' and of a phase fixed relative to the output oscillations. The control pulses generated by the pulse generator 13 are shown in FIG. 2B and are supplied directly to the "AND" gate 14 which is normally arranged to pass the control pulses to the other input circuit of the phase comparator 10.

The phase comparator is in the form of a sampling device of any suitable construction which, in response to each control pulse 13' applied thereto, passes a coincident sample of the shaped reference oscillation 12' to the low-pass filter 16. The filter removes the high-frequency components of the samples and passes to the D.C. amplifier 17 a D.C. signal of a magnitude and polarity dependent upon the magnitude and polarity of the samples.

The output of the D.C. amplifier is applied to the control circuit of the oscillator 15 and it is arranged that, if the potential of the D.C. signal increases, the frequency of the oscillation 15 increases and vice versa.

Figure 2B:
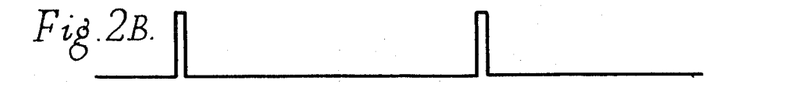

In normal stable operation the relative phase of the control pulses 13' and the shaped reference oscillations 12' is arranged to be such that the control pulses occur during the periods of positive slope 18 in the waveform of the shaped reference oscillations, for example as shown in FIGS. 2A and 2B. Thus, if the frequency of the output oscillations 15' should tend to rise, the output of the comparator 10 and hence the control input to the oscillator 15 would fall providing a compensating correction. Conversely, if the output oscillations 15' should tend to fall in frequency, the output of the comparator 10 would rise and hence lead to a compensating increase in the frequency of the output oscillations. In this way the frequency of the output oscillations is held identical with the frequency of the reference oscillations and their relative phase is held at a fixed value, within the limits of the control system.

Considering now a change in the frequency or phase of the reference oscillations 11', the rate at which the frequency or phase of the output oscillations 15' changes in response to the change in the reference oscillations is determined by the speed of response of the control system.

If the rate of change of the frequency of the reference oscillations 11' increases above a critical value the control system is unable to respond quickly enough to maintain frequency synchronism. Each control pulse 13' will thus advance to the point 22 or retard to the point 20 in the reference oscillations shown in FIG. 2A and will then further advance or retard into the period 20–22. If this were to occur the magnitude of the control signal 17' would change in such a manner as to alter the frequency of the output oscillations in a sense such as to increase the frequency difference between the output oscillations and the reference oscillations. The "slip" of the output oscillations would then continue indefinitely so long as the frequency of the output oscillations relative to the reference oscillations exceeded the "lock-in" range because the control signal 17' would first tend to decrease and then increase the "slip" in a cyclic manner. Thus the control system would maintain frequency synchronism only if the frequency of the output oscillations relative to the reference oscillations were to lie within the range known as the "lock-in" range.

In certain applications such as in television apparatus where the output oscillations are used as synchronising oscillations, it is important that the maximum rate of change in the frequency of the output oscillations is made small; at the same time it is also desirable that the "lock-in" range be as large as possible and hence a compromise is necessary. The present invention avoids the need to make such a compromise in a manner now to be described.

The wave-shaping circuit 12 is connected to the input circuits of a switching-pulse generator 23 and to a restoring-pulse generator 24 through a level comparator 30. The switching-pulse generator 23 has an output circuit connected to one input circuit of an "AND" gate 25 and the restoring-pulse generator 24 has an output circuit connected to one input circuit of an "AND" gate 26. The control-pulse generator 13 is connected to both the other input circuits of the "AND" gates 25 and 26 respectively.

Each of the "AND" gates 25 and 26 has an output circuit connected to an individual input circuit of a bi-stable trigger circuit 27, the "AND" gate 26 being connected directly to the bi-stable circuit 27 and the "AND" gate 25 being connected by way of an "OR" gate 28. The bi-stable circuit 27 has an output circuit connected to the "AND" gate 14.

Figure 2C:
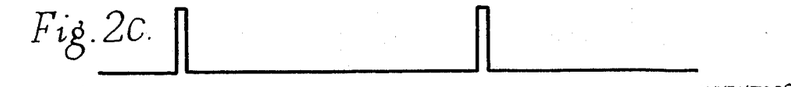
Figure 2D:
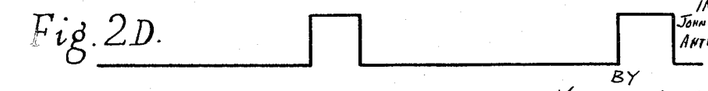

The shaped oscillations 12' provided by the circuit 12 are supplied to the pulse generators 23 and 24 which in response thereto generate respectively the switching pulses 23' shown in FIG. 2D and the restoring pulses 24' shown in FIG. 2C. The switching pulses and restoring pulses are then supplied directly to the "AND" gates 25 and 26 respectively.

If coincidence occurs between a control pulse and a switching pulse, the "AND" gate 25 supplies an output to the bi-stable circuit 27 by way of the "OR" gate 28 which causes the bi-stable circuit to enter one of its two states. Similarly if coincidence occurs between a control pulse and a restoring pulse the "AND" gate 26 supplies an output to the bi-stable circuit, which causes the bi-stable circuit to enter the other of its two states, unless already in that state. When in its one and its other state the bi-stable circuit 27 supplies an output to the "AND" gate 14 which causes the "AND" gate 14 to block and pass respectively the supply of the control pulses 13' from the control pulse generator 13 to the phase comparator 10. The switching pulses 23' are phase displaced relative to the edges 18 of the shaped oscillations 12' by approximately half a cycle of the shaped oscillations while the restoring pulses 24' occur during the period of the edges 18 of the shaped oscillations.

In normal operation, when the output oscillations 15' have a frequency equal to the reference oscillations 11', and the control pulses 13' coincide with the corresponding edges 18 of the shaped oscillations 12', the bi-stable circuit 27 causes the "AND" gate 14 to allow the passage of the control pulses 13' to the phase comparator 10. The resulting output from the phase comparator maintains the frequency of the output oscillator 15 equal to that of the reference oscillations 11', within the limits of the control system, as already described.

If the reference oscillations 11' when first applied are sufficiently high in frequency that the output oscillations 15' "slip" relative to the reference oscillations, the control pulses 13' are retarded first to the point 21, then through the period 21–22 and subsequently into the period 22–20. At this stage one of the control pulses 13' coincides with one of the switching pulses 23' and the "AND" gate 25 is caused to operate by the simultaneous application thereto of the switching pulse 23' and the control pulse 13'. The output from the "AND" gate 25 is passed to the bi-stable circuit 27, switching the bi-stable circuit 27 to the state in which the "AND" gate 14 is caused to block the passage of control pulses 13'. The time constant of the filter 16 is made sufficiently large, of the order of several seconds, to maintain the control signal applied to the oscillator 15 substantially constant while the supply of control pulse 13' to the comparator 10 is blocked. The frequency of the output oscillations 15' therefore remains substantially constant at the value obtaining immediately before the supply of control pulses 13' is blocked and the output oscillations 15' therefore, continue to "slip" relative to the reference oscillation 11'.

The control pulses 13' eventually coincide with the restoring pulses 24' and the "AND" gate 26 is therefore operated to supply and output to the bi-stable circuit 27. The bi-stable circuit 27 is consequently switched back to the state in which the passage of control pulses 13' by the "AND" gate 14 is resumed. It will be seen that in the case where the reference oscillations are greater in frequency than the output oscillations, the "AND" gate 14 is switched to pass control pulses 13' to the comparator whenever the resultant control signal applied to the output oscillator is of a value to reduce the "slip" of the output oscillations 15' relative to the reference oscillations 11' but to block the control pulses 13' whenever the resultant control signal would otherwise increase the "slip."

If the reference oscillations 11' when first applied are sufficiently low in frequency that the control system is again unable to respond quickly enough to maintain frequency synchronism, the output oscillations advance first to the point 19, then through the period 19–20 and subsequently into the period 20–22. At this stage one of the control pulses 13' coincides with one of the switching pulses 23' and the "AND" gate 25 is caused to operate by the simultaneous application thereto of the switching pulse 23' and the control pulse 13'. The output from the "AND" gate 25 is passed to the bi-stable circuit 27, switching the bi-stable circuit 27 to the state in which the "AND" gate 14 is caused to block the passage of control pulses 13'. The filter 14 maintains the control signal applied to the oscillator 15 substantially constant while the supply of control pulse 13' is blocked and the frequency of the output oscillations 15' therefore remains substantially constant in the absence of the control pulses 13'.

The control pulses 13' eventually coincide with the restoring pulses 24' and the "AND" gate 26' is therefore operated to supply an output to the bi-stable circuit 27. The bi-stable circuit 27 is consequently switched back to the state in which the passage of control pulses 13' is resumed. It will be seen that in the case when the reference oscillations are lower in frequency than the output oscillations, the control signal applied to the output oscillator does not result in an increase in the "slip" of the output oscillations 15' relative to the reference oscillations 11'.

During the intervals when the "AND" gate 14 blocks the passage of the control pulses 13', there is no direct control exercised over the frequency of the output oscillator 15 by the phase comparator 10 because such control would vary the frequency of the output oscillations in the wrong sense. The frequency of the output oscillations 15' cannot however, vary relative to the reference oscillations 11' without causing the direct control of frequency to be re-established when the sense of such control is correct. Since when "AND" gate 14 blocks the passage of control pulses 13' the frequency of the output oscillations stays substantially constant instead of varying in the wrong sense, the fact that there are intervals during which no direct control of frequency is exercised by the phase comparator is advantageous. Once equality of the frequencies of reference and output oscillations is established, phase control is maintained between the reference oscillations and output oscillations.

The duration of each switching pulse 23' is related to the maximum rate of "slip" of the output oscillations 15' relative to the reference oscillations 11'. Thus if the "slip" is at its maximum the duration of each switching pulse must be sufficient to ensure that as the control pulses 13' are advanced or retarded relative to the control oscillations, the shift of the control pulses, expressed as a fraction of a cycle of the shaped oscillations, during each cycle of the shaped oscillations is not greater than the duration of the switching pulses, expressed as a fraction of a cycle of the shaped oscillations. Coincidence between one of the switching pulses and one of the control pulses must therefore always occur as the control pulses are advanced or retarded relative to the shaped oscillations through a cycle of the shaped oscillations.

If the reference oscillations are supplied in turn by a plurality of reference sources, for example by the source 35 or the source 11, the sources being locked in frequency relative to one another but subject to phase variations relative to one another, a phase difference between one set of reference oscillations generated by one reference source and a succeeding set of reference oscillations generated by another reference source would give rise to a demand for a sudden phase shift in the output oscillations. In the television apparatus already mentioned such a sudden change is undesirable.

The reference source which is to supply the reference oscillations is selected by means of the source switch 34 which also supplies a signal to the "OR" gate 28, the signal serving to switch the bi-stable circuit to its one state, if not already in that state, and the supply of control pulses to the comparator 10 is blocked. Thus switching from one reference source to another cannot cause the phase of the output oscillations to shift suddenly.

Figure 3:
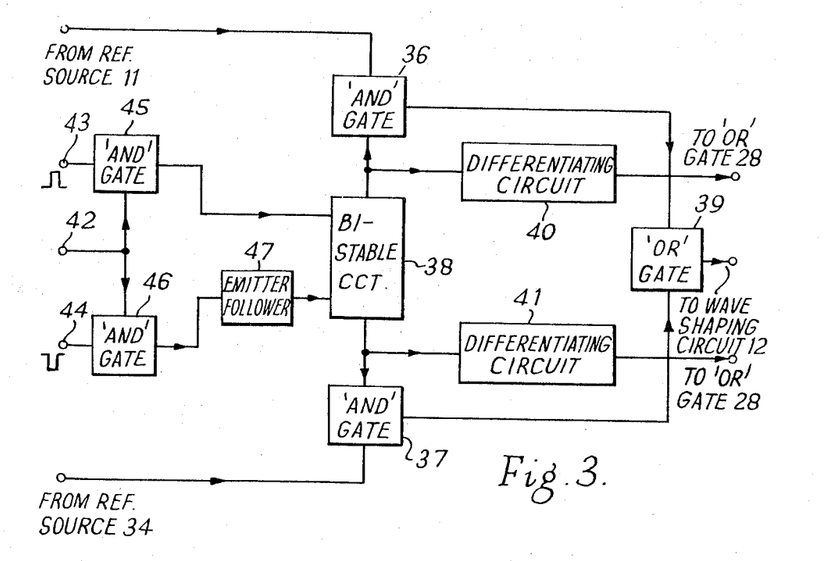
FIG. 3 is a schematic diagram of the source switch of FIG. 1.

The source switch 34 will now be described with reference to FIG. 3. The reference sources 11 and 34 are connected to "AND" gate 36 and 37 respectively. When either of these gates receives an input from a bi-stable circuit 38, the reference source connected to that gate passes its output through an "OR" gate 39 to the wave-shaping circuit 12. At the same time one of two differentiating circuits 40 and 41 differentiates a pulse from the bi-stable circuit 38 to provide a pulse through the "OR" gate 28 to switch the bi-stable circuit 27, which inhibits sampling. In FIG. 1 the two connections between the source switch 34 and the "OR" gate 28 have been shown by one line.

Selection between the sources 11 and 34 is made by applying a positive or negative voltage respectively to a terminal 42. Positive and negative pulses are applied to terminals 43 and 44 respectively at the beginning of every field blanking period of the television signal for which the output oscillations are used as synchronising oscillations. "AND" gates 45 and 46 are therefore open only at times which ensure that a change of reference sources occurs only during field blanking periods. The "AND" gate 45 requires two positive input voltages to open, and the "AND" gate 46 requires two negative input voltages. An emitter follower 47 is required to operate the bi-stable 38 from the gate 46. It can now be seen that when the terminal 42 is made positive the bi-stable circuit 38 supplies a voltage to the gate 36 such that oscillations from the reference source 11 pass to the wave-shaping circuit 12. In the same way when the terminal 42 is made negative, reference oscillations from the source 34 reach the circuit 12.

The source switch described has a timing accuracy suitable for switching reference sources when the output oscillations are used, as mentioned, for television synchronising oscillations. For some other applications a mechanical switch might be used. Such a switch could consist of two sets of wipers and contacts ganged together. One set would be used to connect different reference sources and the other set to provide pulses for the "OR" gate 28.

If the frequency of the reference oscillations increases or decreases, the magnitude of the control signal must be increased or decreased correspondingly to maintain frequency synchronism of the reference and the output oscillations. The increase or decrease in the control signal can only be maintained by allowing the control pulses to be displaced relative to their corresponding edges 18. Thus for any given frequency of the reference oscillations, there is a corresponding relative displacement of the control pulses and the edges 18. It is desirable not to switch the control system to its normal condition until the control pulses and the edges 18 are relatively displaced by the amount corresponding to the frequency of the reference oscillations because no further variation in the phase displacement is necessary to allow the system to synchronise the output oscillations with the reference oscillations.

In order to switch the control system in this manner, the restoring pulses are generated at a time determined by the output of the level comparator 30. The output signal of the amplifier 17 which represents the correction to be applied to the oscillator 15 is applied together with the shaped reference oscillations 12' to the level comparator.

The desired time for switching the control system to its normal condition occurs when the rising voltage of the edge 18 reaches the output voltage of the filter 16 and it is arranged that the pulse generator 24 generates a restoring pulse 24' at this instant. However, it is more convenient to take the amplifier output voltage rather than the filter voltage thus using the amplifier as a buffer. The amplifier output voltage is applied to the level comparator where it is attenuated before comparison with the shaped oscillations 12'. The lever comparator 30 will now be described with reference to FIG. 4. Signals from the output of the amplifier 17 are applied to a resistive mixing network 31 to which a bias signal is also applied. The resulting output signal is arranged to be at the correct level for comparison with the signal 12' from the wave-shaping circuit 12. The two signals which are to be compared are applied to a long-tailed pair circuit 32 operating in the switching mode, see Millman and Taup, "Pulse & Digital Circuits"; McGraw-Hill, 1956, FIGS. 15, 22, page 483.

Figure 4:
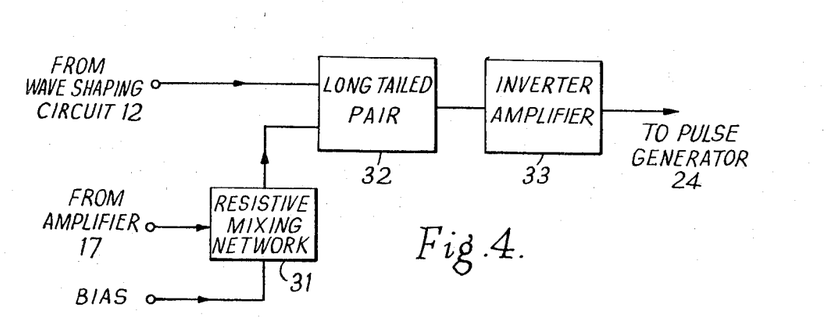
FIG. 4 is a schematic diagram of the level comparator of FIG. 1.

Transistors are used for the long-tailed pair the signals to be compared being applied to the bases of the two transistors respectively. The emitters of the transistors may be supplied with a constant current from the collector of a third transistor. When the shaped reference pulses 12' go suddenly positive and reach the attenuated amplifier voltage a negative step is produced at the output of the long-tailed pair, the third transistor ensuring that the magnitude of the step is always the same regardless of the attenuated amplifier voltage. The negative step is applied to an inverter amplifier 33 and thus a positive step is provided for the pluse generator 24. The region 22–20 of the shaped pulses provides a negative step at the generator 24 in the same way, but the generator is such that it provides restoring pulses only after positive steps. This type of generator is described in British Patent No. 949,100.

Instead of the level comparator 30 a circuit, which triggers the pulse generator 24 at a time after point 19 of each shaped pulse 12' depending on the magnitude of the output signal of the amplifier 17, may be used in another embodiment of the invention. Such a circuit may for instance be a voltage controlled delay line, in which each shaped pulse 12' is delayed by a time dependent on the output voltage of amplifier 17. Another example of a circuit to trigger the pulse generator 24, is a monostable pulse generator timed by a resistance-capacitance circuit wherein the bias voltage to which the timing resistance is connected is controlled. This circuit is described in "Waveforms," M.I.T. series, volume 19, page 168, except that the grid resistor R is returned to a variable voltage, the output voltage of the amplifier 17, instead of the $+E_{pp}$ rail shown. Thus pulses are initiated by the monostable circuit at the point 19 and the duration of these pulses depends on the amplifier output voltage, the generator 24 being triggered by the trailing edge of the pulses.

Figure 5:
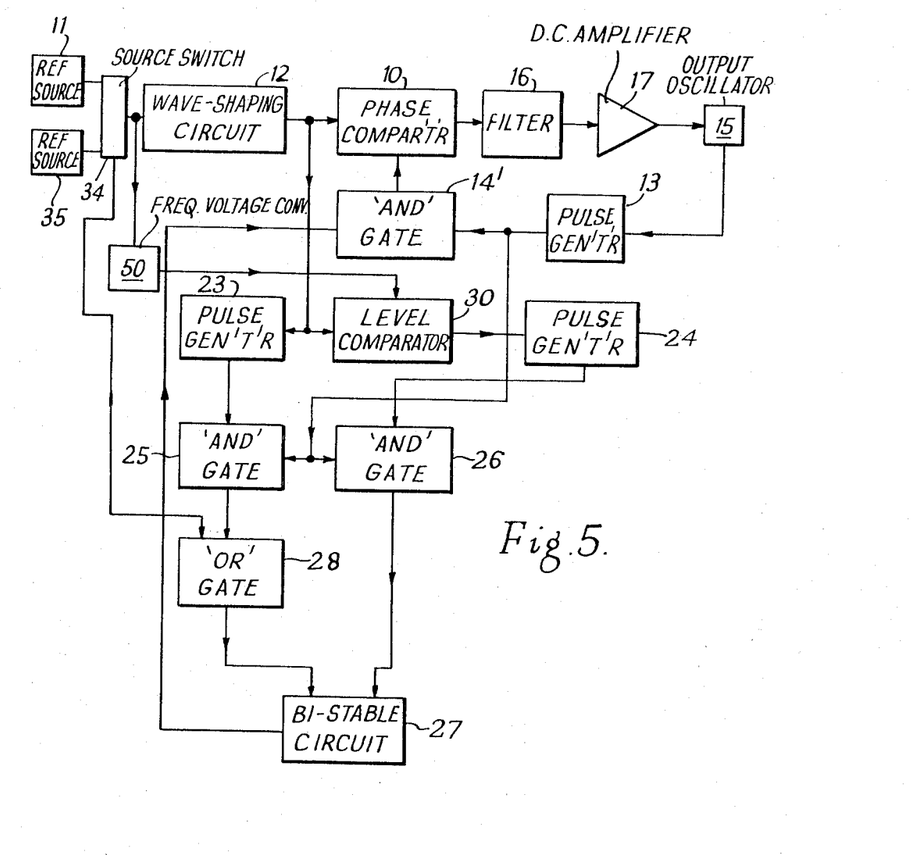
FIG. 5 is a schematic diagram of a further frequency control system embodying the invention.

The alternative circuits, that is the delay line or the monostable circuit or like circuits can be used in the circuit of FIG. 5 instead of the level comparator 30.

Since the frequency of the oscillations 11' of the reference source in use determines what part of the edge 18 should be synchronous with the restoring pulses 24', a circuit 50 such as a Foster-Seeley discriminator circuit which provides a voltage dependent on the frequency of the reference source in use can be connected to the output circuit of the source switch 34 an output of the Foster-Seeley circuit can be used to control the delay due to the voltage controlled delay line or to the variable duration pulse generator or may be fed to one input of the level comparator instead of the output of the amplifier 17 as shown in FIG. 5.

Figure 6:
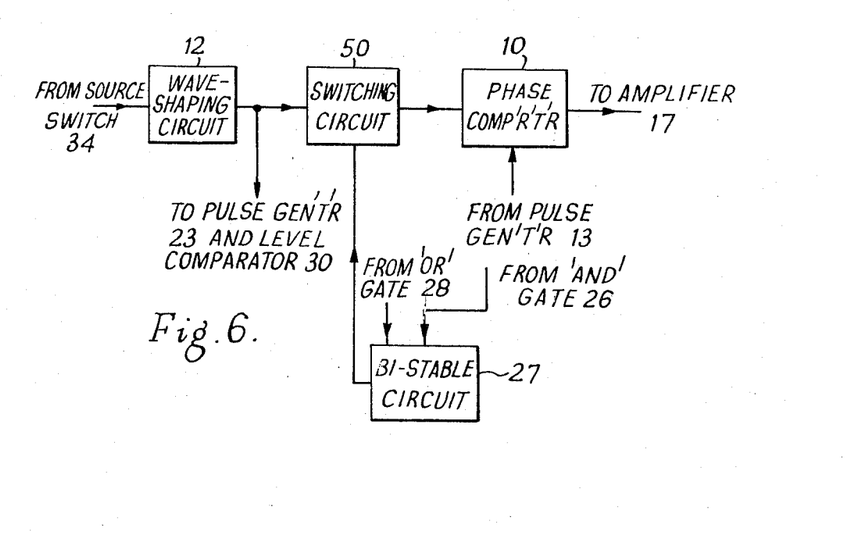
FIG. 6 is a block diagram showing how FIGS. 1 or 5 can be adapted to provide alternative embodiments of the invention.
Figure 7:
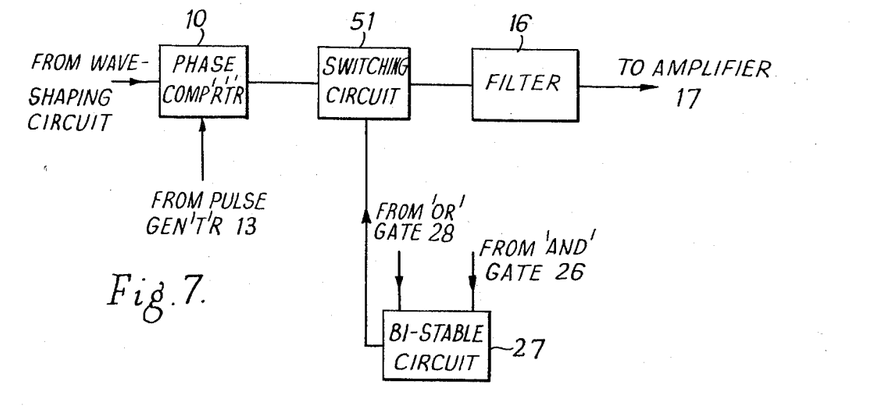
FIG. 7 is a block diagram showing how FIGS. 1 or 5 can be adapted to provide other alternative embodiments of the invention.

In addition, instead of connecting the "AND" gate 14 between the pulse generator 13 and the phase comparator 10, a switching circuit 50 controlled by the circuit 27 could be connected between phase comparator 10 and the filter 16 (see FIG. 6 which shows how the circuits of FIG. 1 or 5 can be adapted to include the switching circuit 50 instead of the "AND" gate 14). Alternatively a switching circuit 51 could be connected in the series circuit between the reference source and the comparator 10, as shown in FIG. 7 which shows how the circuits of FIG. 1 or 5 can be adapted to include the switching circuit 51 instead of the "AND" gate 14. In either of these positions the switching means 50 or 51 would be capable of making the phase comparator incapable of varying the frequency of the output oscillator 15. FIGS. 6 and 7 show only those parts of FIG. 1 or 5 which are changed by the substitution of the switching circuit 50 or 51.

What is claimed is:

1. A frequency control system for synchronizing the frequency of an oscillation generator with the frequency of a source of reference oscillations, comprising in combination with said generator and said source:

a phase comparator having a first input circuit, a second input circuit and an output circuit, said first input circuit being connected to said source to receive oscillations therefrom, said second input circuit being connected to said generator to receive oscillations therefrom, said phase comparator being operative to generate at said output circuit a control signal representative of a variation of the phase of the reference oscillations relative to the output oscillations;

means coupling said output circuit to said oscillation generator, said oscillation generator being responsive to said control signal to tend to cancel said variation in phase;

first sensing means interconnected between said source and said oscillation generator, including means to generate a first switching signal in response to a shift of phase into a range in which the variation in phase would be increased;

second sensing means interconnected between said source and said oscillation generator, including means to generate a second switching signal in response to a shift of phase from said range;

switch means connected to said first and second sensing means to receive said first and second switching signals, said switch means being connected to said comparator to be operative to switch said comparator from an operative to an inoperative condition, including means operable in response to said first and second switching signals to render said comparator inoperative and operative respectively;

and stabilizing means to maintain said oscillation generator at substantially constant frequency whenever said comparator is inoperative.

2. A frequency control system for synchronizing the frequency of an output oscillation generator with the frequency of a source of reference oscillations, comprising in combination with said generator and said source:

a gating circuit having first and second input circuits, and an output circuit;

a wave-shaping circuit interconnecting said source and said first input circuit to derive shaped oscillations of trapezoidal wave form from said source and to apply the shaped oscillations to said first input circuit;

a pulse generator having an input circuit coupled to said oscillation generator to derive gating pulses of a frequency and phase fixed relative to the frequency and phase of the output oscillations of said generator;

means connecting said pulse generator to said second input circuit to apply said gating pulses to said second input circuit;

means connecting said output circuit to said oscillation generator, said gating circuit being operative to pass a sample of said shaped oscillations to said output circuit in response to each gating pulse, said oscillation generator being responsive to said samples to tend to cancel a variation in the phase of said output oscillations relative to said reference oscillations;

first sensing means interconnected between said source and said oscillation generator including means to generate a first switching signal in response to a shift of said phase into a range in which the variation in phase would be increased;

second sensing means interconnected between said source and said oscillation generator including means to generate a second switching signal in response to a shift of said phase from said range;

switch means connected to said first and second sensing means to receive said first and second switching signals, said switch means being connected to said gating circuit to be operative to switch said gating circuit from an operative to an inoperative condition including means operable in response to said first and second switching signals to render said gating circuit inoperative and operative respectively;

and stabilizing means to maintain said oscillation generator at substantially constant frequency whenever said comparator is inoperative.

3. A frequency control system according to claim 2 wherein said stabilizing means provides a control signal for said oscillation generator, and the system further comprises a level-comparator means, having an output circuit connected to said second sensing means, said stabilizing means and said wave-shaping circuit being coupled to said level comparator means for comparison of the magnitude of the control signal and said shaped oscillations whereby the generation of said second switching signal is delayed by a time dependant on the magnitude of said control signal.

4. A frequency control system according to claim 2 further comprising conversion means to provide a control signal dependant on the frequency of said reference oscillations, and a level-comparator means having an output circuit connected to said second sensing means, said wave-shaping circuit and said conversion means being coupled to said level-comparator means for comparison of the magnitude of said control signal and said shaped oscillations whereby the generation of said second switching signal is delayed by a time dependant on the magnitude of said control signal.

5. A frequency control system for synchronizing the frequency of an output oscillation generator with the frequency of a source of reference oscillations, comprising in combination with said generator and said source:

a phase comparator interconnecting said source of oscillations and said oscillation generator including means to generate a control signal representative of a variation of phase of the reference oscillations relative to the output oscillations;

means coupling said comparator to said oscillation generator to apply said control signal to said oscillation generator, said oscillation generator being responsive to said control signal to tend to cancel said variation in phase;

a first pulse generator having an input circuit coupled to said oscillation generator to derive control pulses of frequency and phase fixed relative to the output oscillations;

second and third pulse generators, each having an input circuit connected to said source, to derive switching and restoring pulses respectively, said switching and restoring pulses being of a frequency and phase fixed relative to said reference oscillations;

first coincidence detecting means, having two input circuits connected respectively to said first and second pulse generators, to generate a first switch signal upon coincidence between a control pulse and a switching pulse;

second coincidence detecting means, having input circuits connected to said first and third pulse generators, to generate a second switch signal upon coincidence between a control pulse and restoring pulse;

a switch device;

means connecting an output circuit of each of said coincidence detecting means to said switch device, said switch device being so connected to said comparator as to be operative to switch said comparator from an operative to an inoperative condition including means responsive to said first and second switch signals to render said comparator inoperative and operative respectively;

and stabilizing means to stabilize the frequency of the output oscillations whenever said comparator is operative.

6. A frequency control system according to claim 5, wherein said stabilizing means provides a stabilized-control signal, and the system further comprises control means having an output circuit coupled to said third generator, and two input circuits separately coupled to said stabilising means and said source, whereby the phase of the pulses from said third generator in relation to the reference oscillations is dependant on said stabilized-control signal.

7. A frequency control system according to claim 5 further comprising conversion means to provide a further control signal dependant on the frequency of the reference oscillations, and control means having an output circuit coupled to said third generator, and two input circuit separately coupled to said conversion means and said source whereby the phase of the pulses from said third generator in relation to the reference oscillations is dependant on said further control signal.

8. A frequency control system for synchronizing the frequency of an output oscillation generator with the frequency of a reference source, comprising in combination with said generator and said source:

a comparator;

a first connection between said comparator and said source;

a second connection between said comparator and said generator;

means include in said comparator to derive from said reference and output oscillations a control signal representative of a variation in phase between the output and reference oscillations;

a control connection between said comparator and said generator to apply said control signal to said generator;

means included in said generator to tend to cancel said variation in phase;

first sensing means interconnecting said source and said oscillation generator to sense a shift of said phase into a range in which the variation in phase would be increased;

second sensing means interconnecting said source and said oscillation generator to sense a shift of said phase from said range;

switch means included in one of said connections;

means connecting said first and second sensing means to said switch means;

means included in said switch means, to break and remake said one connection in response to said first and second sensing means respectively;

and stabilizing means to stabilize the frequency of the output oscillations whenever said one connection is broken.

9. A frequency control system for synchronizing the frequency of an output oscillation generator with the frequency of any of a plurality of reference sources, comprising in combination with said generator and said sources:

a comparator, a source-selector means separately interconnecting each of said reference sources with said comparator;

said source-selector means being operable to select reference oscillations from one of said sources to apply to said comparator, said comparator inter-connecting said selector switch with said oscillation generator;

means included in said comparator to generate a control signal representative of a phase variation of the output oscillations relative to the selected reference oscillations;

means to apply said control signal to said oscillation generator;

means included in said generator to tend to cancel said phase variation in response to said control signal;

first sensing means to sense a shift of the phase of the output oscillations relative to the selected reference oscillations within a range in which said variation in phase would be increased;

second sensing means to sense a shift of said phase from said range;

switch means interconnecting said first and second sensing means with said comparator, including means operative to render said comparator inoperative and operative in response to said first and second sensing means respectively;

means interconnecting said switch means with said source selector means, said switch means being operative to render said comparator inoperative in response to operation of said source selector means;

and stabilizing means to stabilize the frequency of said oscillation generator whenever said comparator is inoperative.

10. A frequency control system according to claim 9 wherein said source-selector means includes, a plurality of coincidence means separately connected between each of said sources and said comparator, and control means connected to said coincidence means operable to apply a separate control signal to a selected one of said coincidence means, to pass oscillations from that one of said sources, connected to said selected coincidence means, to said comparator, said control means being also connected to said switch means to apply a further control signal to said switch means at the moment said control signal is applied to one of said coincidence means to render said comparator inoperative.

11. A frequency control system according to claim 9, wherein said stabilizing means provides a stabilized-control signal, and further comprises control means having an output circuit coupled to said second sensing means, and two input circuits separately coupled to said comparator and said source-selector means whereby said operation of said switch means in response to said second sensing means is delayed by a time dependant on said stabilized-control signal.

12. A frequency control system according to claim 9 further comprising conversion means to provide a further control signal dependant on the frequency of said selector reference oscillations, and control means having an output circuit coupled to said second sensing means, and two input circuits separately coupled to said conversion means and said source selector means whereby said operation of said switch means in response to said record sensing means is delayed by a time dependant on said control signal.

13. A frequency control system for synchronizing the frequency of an output oscillation generator with the frequency of any of a plurality of reference sources, comprising in combination with said generator and said sources:

a comparator;

a source-selector means interconnecting each of said reference sources with said comparator, said source-selector means being operable to select reference oscillations from one of said sources to apply to said comparator, said comparator inter-connecting said source-selector means with said oscillation generator;

means included in said comparator to generate a control signal representative of a phase variation of the output oscillations relative to the selected reference oscillations;

means to apply said control signal to said oscillation generator, said oscillation generator being responsive to said control signal to tend to cancel said variation in phase;

a first pulse generator having an input circuit coupled to said oscillation generator to derive control pulses of frequency and phase fixed relative to the output oscillations;

second and third pulse generators, each having an input circuit connected to said source, to derive switching and restoring pulses respectively, said switching and restoring pulses being of a frequency and phase fixed relative to said selected reference oscillations;

first coincidence detecting means, having two input circuits connected respectively to said first and second pulse generators, to generate a first switch signal upon coincidence between a control pulse and a switching pulse;

second coincidence detecting means, having input circuits connected to said first and second pulse generators, to generate a second switch signal upon coincidence between a control pulse and restoring pulse;

a switch device;

means connecting an output circuit of each of said coincidence detecting means to said switch device, said switch device being so connected to said comparator as to be operative to switch said comparator from an operative to an inoperative condition;

means included in said switch device responsive to said first and second switch signals to render said comparator inoperative and operative respectively;

and stabilizing means to stabilize the frequency of the output oscillations whenever said comparator is inoperative.

14. A frequency control system, for synchronizing the frequency of an output oscillation generator with the frequency of a source of reference oscillations, comprising in combination with said generator and said source:

a gating circuit having first and second input circuits and an output circuit;

a wave-shaping circuit interconnecting said source and said first input circuit to derive shaped oscillations of trapezoidal waveform from said reference oscillations and to apply the shaped oscillations to said first input circuit;

a gating pulse generator having an input circuit coupled to said oscillation generator to derive gating pulses of a frequency and phase fixed relative to the frequency and phase of the output oscillations;

means connecting said gating pulse generator to said second input circuit to apply said gating pulses to said second input circuit;

means connecting said output circuit to said oscillation generator, said gating circuit being operative to pass a sample of said shaped oscillations to said output circuit in response to each gating pulse, said oscillation generator being responsive to said samples to tend to cancel a variation in the phase of said output oscillations relative to said reference oscillations;

a switching pulse generator and a restoring pulse generator each having an input circuit connected to said source, said switching pulse generator and restoring pulse generator being operative respectively to derive switching and restoring pulses of a frequency equal to the reference oscillations;

first coincidence detecting means having two input circuits connected respectively to said switching pulse generator and gating pulse generator;

second coincidence detecting means having two input circuits connected respectively to said gating pulse generator and restoring pulse generator, said first coincidence detecting means being operative to generate a first switching signal in response to coincidence between a gating pulse and a switching pulse, said second coincidence detecting means being operative to generate a second switching signal in response to coincidence between a gating pulse and a restoring pulse;

a switch connected to both coincidence detecting means to receive both said switching signals, said switch being further connected to be operable to switch said comparator from an operative to an inoperative state;

means included in said switch responsive to a first switching signal to render said comparator inoperative and responsive to a second switching signal to render said comparator operative;

and stabilizing means to stabilize the frequency of said oscillation generator whenever said comparator is inoperative.

15. A frequency control system for synchronizing the frequency of an output oscillation generator with the frequency of any of a plurality of reference sources, comprising in combination with said generator and said sources;

a comparator;

a source-selector means interconnecting each of said reference sources with said comparator, said source-selector means being operable to select reference oscillations from one of said sources to apply to said comparator, said comparator inter-connecting said source-selector means with said oscillation generator;

means included in said comparator to generate a control signal representative of a phase variation of the output oscillations relative to the selected reference oscillations;

means to apply said control signal to said oscillation generator, said oscillation generator being responsive to said control signal to tend to cancel said variation in phase;

a first pulse generator having an input circuit coupled to said oscillation generator to derive control pulses of frequency and phase fixed relative to the output oscillations;

second and third pulse generators, each having an input circuit connected to said source, to derive switching and restoring pulses respectively, said switching pulses being of a frequency and phase fixed relative to said selected reference oscillations;

first coincidence detecting means, having two input circuits connected respectively to said first and second pulse generators, to generate a first switch signal upon coincidence between a control pulse and a switching pulse;

second coincidence detecting means, having input circuits connected to said first and second pulse generators, to generate a second switch signal upon coincidence between a control pulse and restoring pulse;

a switch device;

means connecting an output circuit of each of said coincidence detecting means to said switch device, said switch device being so connected to said comparator as to be operative to switch said comparator from an operative to an inoperative condition;

means includes in said switch device responsive to said first and second switch signals to render said comparator inoperative and operative respectively;

stabilizing means to stabilize the frequency of the output oscillations whenever said comparator is inoperative, said stabilizing means providing a stabilized-control signal, and control means having an output circuit coupled to said third generator, and two input circuits separately coupled to said comparator and said source-selector means, to vary the phase of said restoring pulses from said third generator in relation to said selected reference oscillations in responsive to said stabilized-control signal.

16. A frequency control system for synchronizing the frequency of an output oscillation generator with the frequency of any of a plurality of reference sources, comprising in combination with said generator and said sources:

a comparator;

a source-selector means interconnecting each of said reference sources with said comparator, said source-selector means being operable to select reference oscillations from one of said sources to apply to said comparator, said comparator inter-connecting said source-selector means with said oscillation generator;

means includes in said comparator to generate a control signal representative of a phase variation of the output oscillations relative to the selected reference oscillations;

means to apply said control signal to said oscillation generator, said oscillation generator being responsive to said control signal to tend to cancel said variation in phase;

a first pulse generator having an input circuit coupled to said oscillation generator to derive control pulses of frequency and phase fixed relative to the output oscillations;

second and third pulse generators, each having an input circuit connected to said source, to derive switching and restoring pulses respectively, said switching pulses being of a frequency and phase fixed relative to said selected reference oscilliations;

first coincidence detecting means, having two input circuits connected respectively to said first and second pulse generators, to generate a first switch signal upon coincidence between a control pulse and a switching pulse;

second coincidence detecting means, having input circuits connected to said first and second pulse generators, to generate a second switch signal upon coincidence between a control pulse and restoring pulse;

a switch device;

means connecting an output circuit of each of said coincidence detecting means to said switching device, said switch device being so connected to said comparator as to be operative to switch said comparator from an operative to an inoperative condition;

means included in said switch device responsive to said first and second switch signals to render said comparator inoperative and operative respectively;

stabilizing means to stabilize the frequency of the output oscillations whenever said comparator is inoperative, conversion means to provide a further control signal dependant on the frequency of the reference oscillations, and control means having an output circuit coupled to said third generator, and two input circuits separately coupled to said conversion means and said source-selector means, to vary the phase of said restoring pulses from said third generator in relation to said selected reference oscillations in response to said further control signal.

No references cited.

ROY LAKE, *Primary Examiner.*

J. KOMINSKI, *Assistant Examiner.*